US011541762B2

(12) United States Patent
Eitzer

(10) Patent No.: US 11,541,762 B2
(45) Date of Patent: Jan. 3, 2023

(54) SYSTEMS AND METHODS FOR EXTENDING A VEHICLE STALL

(71) Applicant: TOYOTA MOTOR ENGINEERING & MANUFACTURING NORTH AMERICA, INC., Plano, TX (US)

(72) Inventor: Arlo Eitzer, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 261 days.

(21) Appl. No.: 17/077,370

(22) Filed: Oct. 22, 2020

(65) Prior Publication Data

US 2022/0126700 A1   Apr. 28, 2022

(51) Int. Cl.
| | |
|---|---|
| B60L 15/00 | (2006.01) |
| B60L 15/20 | (2006.01) |
| B60K 1/02 | (2006.01) |
| B60W 10/08 | (2006.01) |
| B60W 30/188 | (2012.01) |
| B60K 17/06 | (2006.01) |

(52) U.S. Cl.
CPC ............... B60L 15/20 (2013.01); B60K 1/02 (2013.01); B60K 17/06 (2013.01); B60W 10/08 (2013.01); B60W 30/188 (2013.01); B60L 2240/425 (2013.01)

(58) Field of Classification Search
CPC ..... B60L 15/20; B60L 2240/425; B60K 1/00; B60K 1/02; B60K 17/06; B60K 7/0007; B60K 17/08; B60W 10/08; B60W 30/188; Y02T 10/72
See application file for complete search history.

(56) References Cited

U.S. PATENT DOCUMENTS

| 10,122,603 | B2 | 11/2018 | Bodziony et al. | |
|---|---|---|---|---|
| 2004/0065490 | A1* | 4/2004 | Saito | B60L 3/003 180/65.23 |
| 2009/0043465 | A1* | 2/2009 | Tomita | B60K 6/445 701/51 |
| 2009/0093337 | A1* | 4/2009 | Soliman | B60K 6/442 903/946 |
| 2012/0185143 | A1* | 7/2012 | Ohno | B60W 30/1843 701/99 |
| 2012/0208672 | A1* | 8/2012 | Sujan | B60W 30/188 180/65.265 |
| 2013/0151057 | A1* | 6/2013 | Matsubara | B60W 10/02 180/65.265 |

(Continued)

FOREIGN PATENT DOCUMENTS

DE    102007056722 A1    7/2008

*Primary Examiner* — Phutthiwat Wongwian
*Assistant Examiner* — Sherman D Manley
(74) *Attorney, Agent, or Firm* — Haynes and Boone, LLP

(57) ABSTRACT

Apparatuses and methods for controlling torque produced by a propulsion system in a vehicle. A torque request is received for the propulsion system with the propulsion system having a motor speed of substantially zero. A first torque that meets the torque request is produced using a first motor system of the propulsion system. A first thermal condition of the first motor system is identified. Torque production is switched from the first motor system to a second motor system of the propulsion system in response to a determination that the first thermal condition meets a first set of criteria.

20 Claims, 8 Drawing Sheets

(56) References Cited

U.S. PATENT DOCUMENTS

| | | | | |
|---|---|---|---|---|
| 2016/0214504 A1* | 7/2016 | Park | ............................ | B60L 3/10 |
| 2018/0290655 A1* | 10/2018 | Sato | ..................... | B60L 15/2081 |
| 2019/0135103 A1* | 5/2019 | Kuze | ....................... | B60K 6/543 |

* cited by examiner

SYSTEMS AND METHODS FOR EXTENDING A VEHICLE STALL

FIELD

The present disclosure relates generally to managing a vehicle stall, and more particularly, to systems and methods for using multiple motors to extend the time a vehicle is capable of maintaining a stall.

BACKGROUND

An electric vehicle (e.g., a fully electric vehicle or a hybrid electric vehicle) enters a "stall" condition or stall state when the electric motor system of the electric vehicle has stopped but produces torque. When the electric motor system is stopped, the motor speed is substantially zero. An electric vehicle may enter a stall condition when holding a position on a hill. For example, the electric vehicle may need to produce torque with the electric motor system being stopped in order to maintain the position on the hill without rolling up or down the hill. An electric motor system producing torque while being stopped can result in a low resistance, high voltage path forming within the electronics and coils of the electric motor system. This low resistance, high voltage path may result in heat generation which can lead to damage of one or more components in the electric motor system. Some currently available systems for preventing this damage include limiting the amount of time that the torque is produced to maintain the stall condition. After this amount of time has lapsed, the electric motor system is controlled to reduce the torque produced, bringing the electric vehicle out of the stall condition. Thus, in certain scenarios, these types of electric vehicles may be unable to hold a stall condition for as long as desired.

SUMMARY

In one embodiment, a method is provided for controlling a propulsion system in a vehicle. A torque request is received for the propulsion system with the propulsion system having a motor speed of substantially zero. A first torque that meets the torque request is produced using a first motor system of the propulsion system. A first thermal condition of the first motor system is identified. Torque production is switched from the first motor system to a second motor system of the propulsion system in response to a determination that the first thermal condition meets a first set of criteria.

In another embodiment, a method is provided for controlling a propulsion system in a vehicle. A torque request is received with a motor speed of the propulsion system being substantially zero. Torque production is alternated between a first motor system of the propulsion system and a second motor system of the propulsion system to prevent a first thermal condition of the first motor system and a second thermal condition of the second motor system from reaching a threshold thermal condition while meeting the torque request.

In yet another embodiment, a system comprises a propulsion system and a torque control system. The propulsion system comprises a first motor system and a second motor system. The torque control system is configured to receive a torque request with a motor speed of the propulsion system being substantially zero and to alternate torque production between the first motor system and the second motor system to prevent a first thermal condition of the first motor system and a second thermal condition of the second motor system from reaching a threshold thermal condition while meeting the torque request.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In addition, the present disclosure may repeat reference numerals, letters, or both in the various examples. This repetition is for the purpose of simplicity and clarity and does not in itself dictate a relationship between the various embodiments and/or configurations discussed.

DETAILED DESCRIPTION

Figure 1:
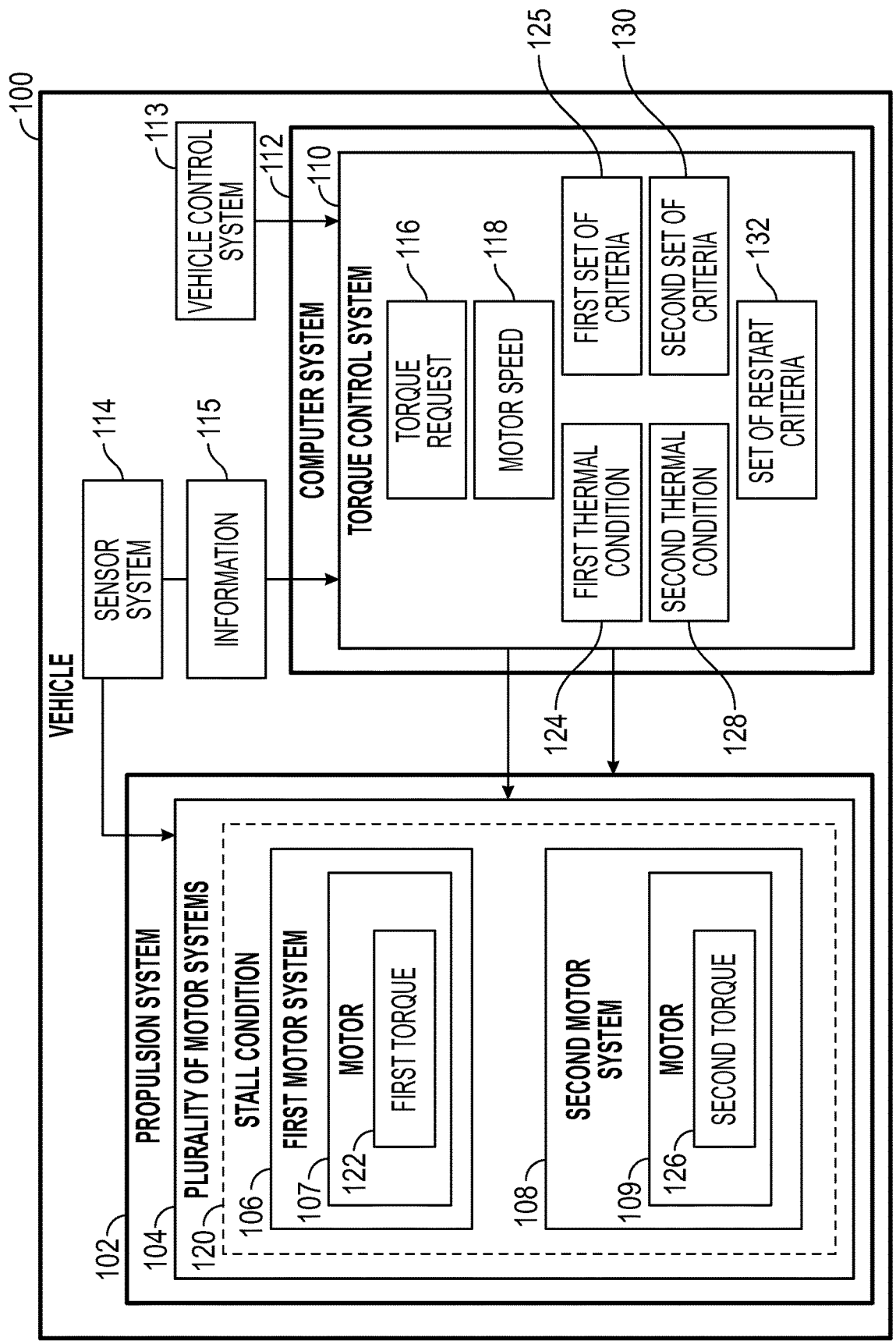
FIG. 1 is a block diagram of a vehicle in accordance with one or more embodiments.

Illustrative embodiments and related methods of the present disclosure are described below as they might be employed in one or more methods and systems for managing a stall condition (or stall or stall state) of a vehicle having an electric motor system. In the interest of clarity, not all features of an actual implementation or method are described in this specification. It will of course be appreciated that in the development of any such actual embodiment, numerous implementation specific decisions must be made to achieve the developers' specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure. Further aspects and advantages of the various embodiments and related methods of the disclosure will become apparent from consideration of the following description and drawings.

The example embodiments described below recognize that it may be desirable to have systems and methods system that can extend the amount of time that a vehicle can hold a stall condition (or stall state). In particular, the embodiments described herein provide methods and systems for extending the allowed vehicle stall time using multiple motor systems. These multiple motor systems are operated in an alternating manner to produce the torque needed to maintain the stall, while also preventing undesired effects (e.g., thermal damage) to the motor systems.

In one or more embodiments, two motor systems are used to maintain a stall condition. For example, the torque needed to maintain the stall condition is produced using a first motor system. When a first thermal condition of the first motor system meets a first set of criteria (e.g., reaches a high threshold temperature), torque production is switched to a second motor system. This switch allows the first motor system time to cool off. This process may then be repeated when a second thermal condition of the second motor system meets a second set of criteria (e.g., reaches a high threshold temperature). In other words, torque production is switched from the second motor system back to the first motor system. In other embodiments, the switch occurs when the first motor system has cooled off sufficiently (e.g., reached a low threshold temperature). These threshold temperatures may be selected based on the operating parameters of the motor systems themselves.

"Handing off" torque production between the two motor systems enables the allowable stall time to be extended. In particular, alternating between the two motor systems extends the time over which torque can be produced without resulting in undesired effects on the motor systems. This extension of stall time, in turn, may extend the time that the vehicle can maintain its position (e.g., maintain its accelerator hold on a hill).

Referring now to the figures, FIG. 1 is a block diagram of a vehicle 100 in accordance with one or more embodiments. Vehicle 100 may take a number of different forms. In one or more examples, vehicle 100 may be a car, a truck, a sports utility vehicle (SUV), a construction vehicle, a bus, a semi-trailer truck, a heavy-duty vehicle, or another type of vehicle.

Vehicle 100 includes propulsion system 102. In these embodiments, propulsion system 102 is an electric propulsion system. Propulsion system 102 includes a plurality of motor systems 104. Each motor system in plurality of motor systems 104 includes at least a motor. In one or more embodiments, each motor system further includes an inverter, one or more other components (e.g., wires, cables, etc.), or a combination thereof.

In one or more embodiments, plurality of motor systems 104 includes first motor system 106 and second motor system 108. First motor system 106 includes motor 107; second motor system 108 includes motor 109. First motor system 106 may further include an inverter, as well as one or more other components. Second motor system 108 may further include an inverter, as well as one or more other components. In one or more embodiments, motor 107 and motor 109 are electric motors. For example, without limitation, motor 107 and motor 109 may be three-phase induction motors (e.g., three-phase, four pole induction motors).

Vehicle 100 further includes torque control system 110. Torque control system 110 may be implemented using hardware, software, firmware, or a combination thereof. In one or more embodiments, torque control system 110 is implemented (partially or fully) using computer system 112. Computer system 112 may be a single computer or multiple computers in communication with each other. In one or more embodiments, computer system 112 is implemented onboard vehicle 100. In other embodiments, computer system 112 is at least partially implemented outside vehicle 100. In some embodiments, computer system 112 is at least partially implemented within vehicle control system 113 of vehicle 100 or another control system that controls operation of propulsion system 102 of vehicle 100.

Torque control system 110 controls the torque produced by propulsion system 102. In one or more embodiments, torque control system 110 is in communication with sensor system 114. In some embodiments, sensor system 114, or at least a portion of sensor system 114, is considered part of or otherwise integrated as part of torque control system 110. Sensor system 114 includes one or more sensors or sensor systems, each of which may, in turn, be comprised of one or more sensors or sensor systems.

Torque control system 110 may receive torque request 116. Torque request 116 may be received from, for example, without limitation, vehicle control system 113 of vehicle 100. In other embodiments, torque request 116 is received by another control system controlling operation of propulsion system 102 within vehicle 100. This other control system, which may be considered part of or separate from vehicle control system 113, may be implemented onboard vehicle 100, outside of vehicle 100, via a cloud computing platform, or a combination thereof.

Torque request 116 may be a request for a nonzero torque. In other words, the request for torque may be for any torque that is not zero or torque that is outside of a selected range from zero. The selected range may depend on the type of vehicle in which propulsion system 102 is being used, as well as other factors. The selected range may be, for example, but is not limited to, 0.25 Newton-meter (Nm), 0.5 Nm, 1 Nm, 2 Nm, 3 Nm, 5 Nm, 7 Nm, 10 Nm, 12 Nm, 20 Nm, or some other specified torque value. For example, when the selected range is 5 Nm, the torque request may be any request for torque beyond 5 Nm from zero (e.g., >5 Nm or <−5 Nm).

Torque control system 110 receiving torque request 116 for propulsion system 102 with motor speed 118 for vehicle 100 being substantially zero indicates that vehicle 100 is in or entering stall condition (or stall state) 120. Stall condition 120 may also be referred to as an accelerator hold condition. As one example, vehicle 100 may enter stall condition 120 when braking on a hill. Producing torque while motor speed 118 is substantially zero enables vehicle 100 to maintain a position on a hill without moving up or down the hill.

Motor speed 118 of propulsion system 102 may include the speed of motor 107 in first motor system 106 of propulsion system 102 and the speed of motor 109 in second motor system 108 of propulsion system 102. Thus, motor speed 118 of propulsion system 102 may be considered substantially zero when the speed of motor 107 and the speed of motor 109 are both substantially zero. A speed of substantially zero includes a speed of zero and may include other speeds within a selected range of zero. The selected range may depend on the type of vehicle in which the propulsion system is being used, as well as other factors. This selected range may be, for example, but is not limited to, 5 revolutions per minute (rpm), 10 revolutions per minute (rpm), 20 rpm, 50 rpm, 75 rpm, 100 rpm, 125 rpm, or some other value for speed. As one example, when the selected range is 100 rpm, a speed between and including 0 to 99.9 rpm (or between and including 0 to 100 rpm) may be considered substantially zero.

In response to a request to enter or maintain stall condition 120 (torque request 116 with motor speed 118 being substantially zero), torque control system 110 produces first torque 122 that meets torque request 116 using first motor system 106. For example, first motor system 106 may be operated to ramp up the production of first torque 122 until first torque 122 fulfills torque request 116 to maintain stall condition 120.

While maintaining stall condition 120, torque control system 110 monitors first thermal condition 124 of first motor system 106. In one or more embodiments, first thermal condition 124 includes a temperature for first motor system 106. This temperature may include a single temperature for first motor system 106, a single temperature for motor 107 of first motor system 106, one or more temperatures for one or more other components of first motor system 106, a temperature average for first motor system 106, or a combination thereof.

The monitoring of first thermal condition 124 may be performed using information 115 generated by sensor system 114. In one or more embodiments, sensor system 114 is used to directly measure the temperature for first motor system 106. In other embodiments, sensor system 114 is used to measure at least one parameter (e.g., current) with respect to one or more components of first motor system 106. Torque control system 110 may receive information 115 generated by sensor system 114 and identify first thermal condition 124 for first motor system 106 using information 115. For example, torque control system 110 may extrapolate first thermal condition 124 using information 115 generated by sensor system 114.

Torque control system 110 determines when first thermal condition 124 meets first set of criteria 125 and switches torque production from first motor system 106 to second motor system 108. First set of criteria 125 may include one or more criteria. In one or more embodiments, first set of criteria 125 includes a temperature for first motor system 106 reaching a high threshold temperature or being within a selected range of the high threshold temperature. First set of criteria 125 for first thermal condition 124 may be selected such that torque production is switched from first motor system 106 to second motor system 108 to prevent undesired effects or an undesired condition for first motor system 106 (e.g., an overheated state in which damage may be caused to one or more components of first motor system 106, one or more other components of propulsion system 102, or a combination thereof).

In one or more embodiments, first set of criteria 125 includes a high threshold temperature selected based on at least one of the characteristics of, operating parameters of, or other factors related to first motor system 106. The high threshold temperature may be selected as any temperature within a selected range of another, higher temperature that has been identified as leading to one or more undesired effects occurring with respect to first motor system 106. This higher temperature may be referred to as the undesired or critical temperature for first motor system 106. The critical temperature is based on at least one of the characteristics of, operating parameters of, or other factors related to first motor system 106. For example, the critical temperature may be, but is not limited to, about 100 degrees Celsius, about 130 degrees Celsius, about 140 degrees Celsius, about 150 degrees Celsius, about 175 degrees Celsius, or some other temperature.

The high threshold temperature is a temperature set at a particular interval (e.g., about 10 degrees, about 15 degrees, about 20 degrees, about 30 degrees, about 40 degrees, about 50 degrees, etc.) below the critical temperature to serve as a "warning temperature." The particular interval is selected to enable sufficient time to switch motor systems before any undesired effects occur. The high threshold temperature may be, for example, about 80 degrees Celsius, about 100 degrees Celsius, about 105 degrees Celsius, about 110 degrees Celsius, about 115 degrees Celsius, about 120 degrees Celsius, or another temperature. In some cases, such as, for example, when first motor system 106 is used in a refrigerated environment, both the critical temperature, and thereby the high threshold temperature, may be a temperature below about 50 degrees Celsius, below about 30 degrees Celsius, below about 20 degrees Celsius, below about 10 degrees Celsius, or below another temperature at which undesired effects may occur with such a motor system.

Switching torque production from first motor system 106 to second motor system 108 may include ramping down first torque 122 produced by first motor system 106 to zero, while ramping up second torque 126 produced by second motor system 108 to meet torque request 116. Then, in a manner similar to that described above for first motor system 106, torque control system 110 monitors second thermal condition 128 for second motor system 108.

In one or more embodiments, second thermal condition 128 includes a temperature for second motor system 108. This temperature may include a single temperature for second motor system 108, a single temperature for motor 109 of second motor system 108, one or more temperatures for one or more other components of second motor system 108, a temperature average for second motor system 108, or a combination thereof.

As with the monitoring of first thermal condition 124, the monitoring of second thermal condition 128 may be performed using information 115 provided by sensor system 114. In one or more embodiments, sensor system 114 is used to measure the temperature for second motor system 108. In other embodiments, sensor system 114 is used to measure at least one parameter (e.g., current) with respect to one or more components of second motor system 108. Torque control system 110 may receive information 115 generated by sensor system 114 and identify second thermal condition 128 for second motor system 108 using information 115.

Torque control system 110 determines when second thermal condition 128 meets second set of criteria 130 and in response, switches torque production from second motor system 108 back to first motor system 106. Second set of criteria 130 may include one or more criteria. In one or more embodiments, second set of criteria 130 includes a temperature for second motor system 108 reaching a high threshold temperature or being within a selected range of the high threshold temperature. Second set of criteria 130 for second thermal condition 128 may be selected such that torque production is switched from first motor system 106 to second motor system 108 to prevent undesired effects or an undesired condition for first motor system 106 (e.g., an overheated state in which damage may be caused to one or more components of first motor system 106, one or more other components of propulsion system 102, or a combination thereof).

In one or more embodiments, second set of criteria 130 includes a high threshold temperature selected based on at least one of the characteristics of, operating parameters of, or other factors related to second motor system 108. The high threshold temperature may be selected as any temperature within a selected range of another, higher temperature that has been identified as leading to one or more undesired effects occurring with respect to second motor system 108. This higher temperature may be referred to as the undesired or critical temperature for second motor system 108. The critical temperature is based on at least one of the characteristics of, operating parameters of, or other factors related to second motor system 108. For example, the critical temperature may be, but is not limited to, about 100 degrees Celsius, about 130 degrees Celsius, about 140 degrees Celsius, about 150 degrees Celsius, about 175 degrees Celsius, or some other temperature. The critical temperature for second motor system 108 may be the same as or different from the critical temperature for first motor system 106.

The high threshold temperature is a temperature set at a particular interval (e.g., about 10 degrees, about 15 degrees, about 20 degrees, about 30 degrees, about 40 degrees, about 50 degrees, etc.) below the critical temperature to serve as a "warning temperature." The particular interval is selected to enable sufficient time to switch motor systems before any undesired effects occur. The high threshold temperature may be, for example, about 80 degrees Celsius, about 100 degrees Celsius, about 105 degrees Celsius, about 110 degrees Celsius, about 115 degrees Celsius, about 120 degrees Celsius, or another temperature. In some cases, such as, for example, when second motor system 108 is used in a refrigerated environment, both the critical temperature, and thereby the high threshold temperature, may be a temperature below about 30 degrees Celsius, below about 20 degrees Celsius, below about 10 degrees Celsius, below about 5 degrees Celsius, or another temperature. The high threshold temperature included in first set of criteria 125 may be the same as or different from the high threshold temperature included in second set of criteria 130.

In some embodiments, torque control system 110 switches torque production from second motor system 108 back to first motor system 106 when first thermal condition 124 of first motor system 106 meets set of restart criteria 132. Set of restart criteria 132 may include, for example, but is not limited to, a low threshold temperature for first motor system 106. This low threshold temperature may be based on a safe, normal, or otherwise selected operating temperature for first motor system 106. For example, when first motor system 106 (or one or more components of first motor system 106) has reached a temperature at or below the low threshold temperature, torque control system 110 may switch torque production back to first motor system 106 regardless of whether second motor system 108 has reached the high threshold temperature.

In one or more embodiments, set of restart criteria 132 includes a low threshold temperature selected based on at least one of the characteristics of, operating parameters of, or other factors related to first motor system 106. The low threshold temperature may be set to an interval (e.g., about 5 degrees, about 10 degrees, about 20 degrees, about 25 degrees, about 30 degrees, etc.) below the high threshold temperature in first set of criteria 125. The low threshold temperature is selected to ensure a desired amount of operating time for first motor system 106 before first motor system 106 again meets first set of criteria 125. In some embodiments, the low threshold temperature may be selected as any temperature between about 60 degrees Celsius and about 80 degrees Celsius. For example, the low threshold temperature may be, but is not limited to, about 65 degrees Celsius, about 70 degrees Celsius, about 75 degrees Celsius, or some other temperature. In other embodiments, the low threshold temperature may be a temperature between about −15 degrees Celsius and about 50 degrees Celsius.

In this manner, torque control system 110 is capable of alternating torque production between first motor system 106 and second motor system 108 while meeting torque request 116 and maintaining stall condition 120. This type of alternating, which may be referred to as "multi-motor handoff," prevents first thermal condition 124 of first motor system 106 and second thermal condition 128 of second motor system 108 from reaching a threshold thermal condition. This type of control extends the time that propulsion system 102 is capable of maintaining stall condition 120 without resulting in undesired effects to first motor system 106, second motor system 108, another component of propulsion system 102, or a combination thereof.

Torque control system 110 continues this control of torque production in response to torque request 116 until stall condition 120 is to be ended. Stall condition 120 is to be ended, for example, when torque control system 110 receives a request to produce zero torque (or substantially zero torque), when torque control system 110 determines that motor speed 118 is no longer substantially zero, or both.

Although the embodiments described above have been discussed with respect to two motor systems, similar concepts may be implemented in propulsion system 102 having three or more motor systems. Having more motor systems may enable a longer time for the individual motor systems to "cool off" before being tasked again with producing torque for stall condition 120. As one example, the handoff may occur in the following order: motor A to motor B, motor B to motor C, motor C back to motor A, and so on as needed.

Figure 2:
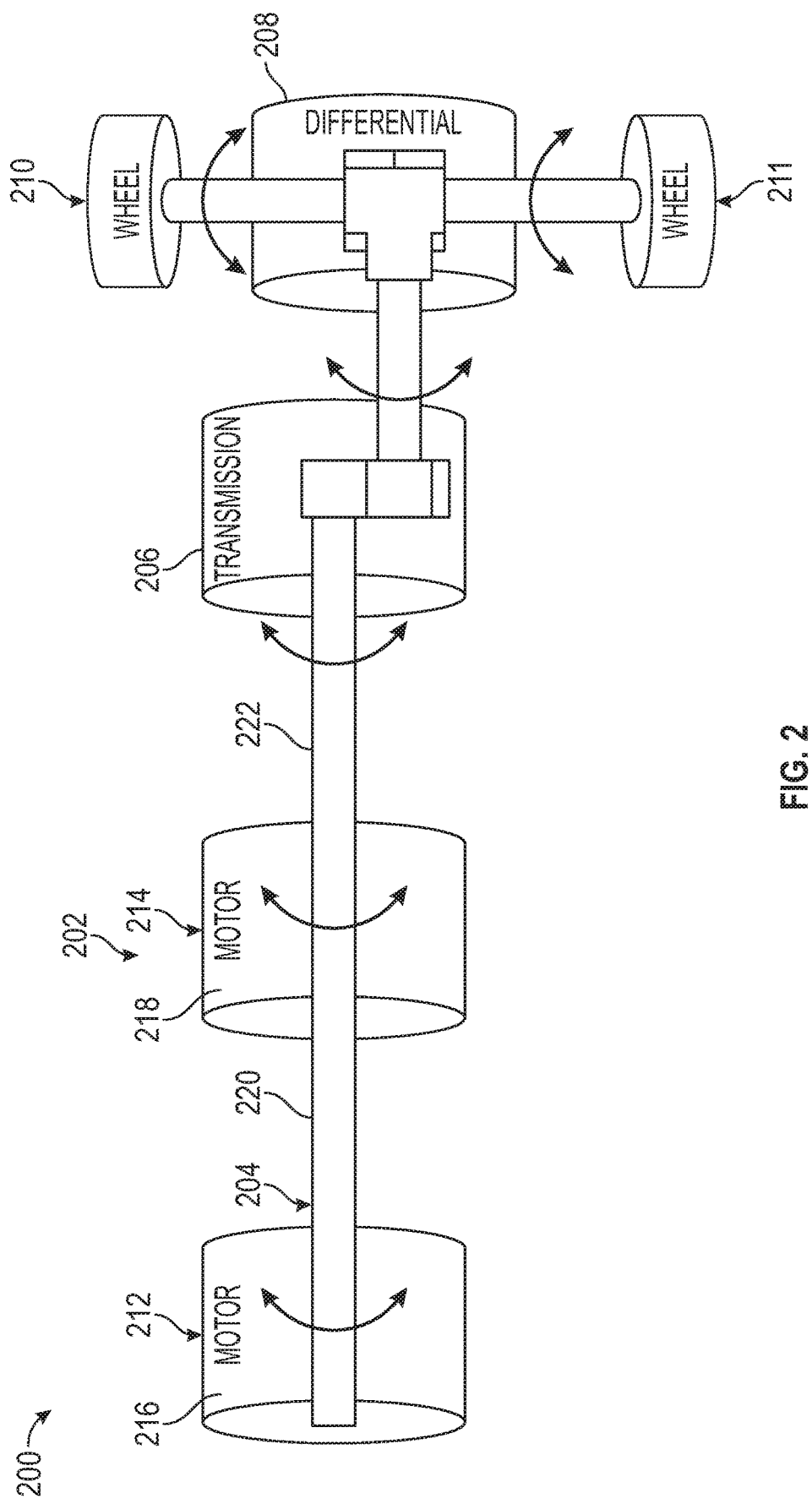
FIG. 2 is a schematic diagram of a portion of one configuration for a powertrain in accordance with one or more embodiments.

FIG. 2 is a schematic diagram of a portion of one configuration for a powertrain in accordance with one or more embodiments. Powertrain 200 includes propulsion system 202, shaft system 204, transmission 206, differential 208, wheel system 210, and wheel system 211. Propulsion system 202 is an example of one implementation for propulsion system 102 in FIG. 1.

Propulsion system 202 includes first motor system 212 and second motor system 214 which are examples of implementations for first motor system 106 and second motor system 108, respectively, from FIG. 1. First motor system 212 includes first motor 216, while second motor system 214 includes second motor 218. First motor system 212 and second motor system 214 may each also include an inverter.

Shaft system 204 includes one or more shaft members that are coupled together and/or to the various components of powertrain 200. A shaft member may be an individual shaft or a section of a shaft. In FIG. 2, shaft system 204 includes shaft member 220 connecting first motor 216 and second motor 218 and shaft member 222 connecting second motor 218 and transmission 206.

Transmission 206 adapts the torque produced by first motor 216 and second motor 218 to be transferred to wheel system 210 and wheel system 211. Differential 208 channels this torque to wheel system 210 and wheel system 211. Each of wheel system 210 and wheel system 211 may include one or more wheels, hubs, spokes, rims, tires, other components, or a combination thereof.

In one or more embodiments, a torque control system, such as torque control system 110 in FIG. 1, may be used to alternate between first motor system 212 and second motor system 214 during a stall condition. This alternating between first motor system 212 and second motor system 214 may be performed in any of the various ways described herein. As one example, while both first motor 216 and second motor 218 are stopped (e.g., have a speed of substantially zero), torque may be produced by a selected motor system of first motor system 212 and second motor system 214 to meet the requested torque needed to maintain the stall condition. When a thermal condition of that selected motor system meets a selected set of criteria, the torque control system switches torque production from the selected motor system to the other of first motor system 212 and second motor system 214.

Figure 3:
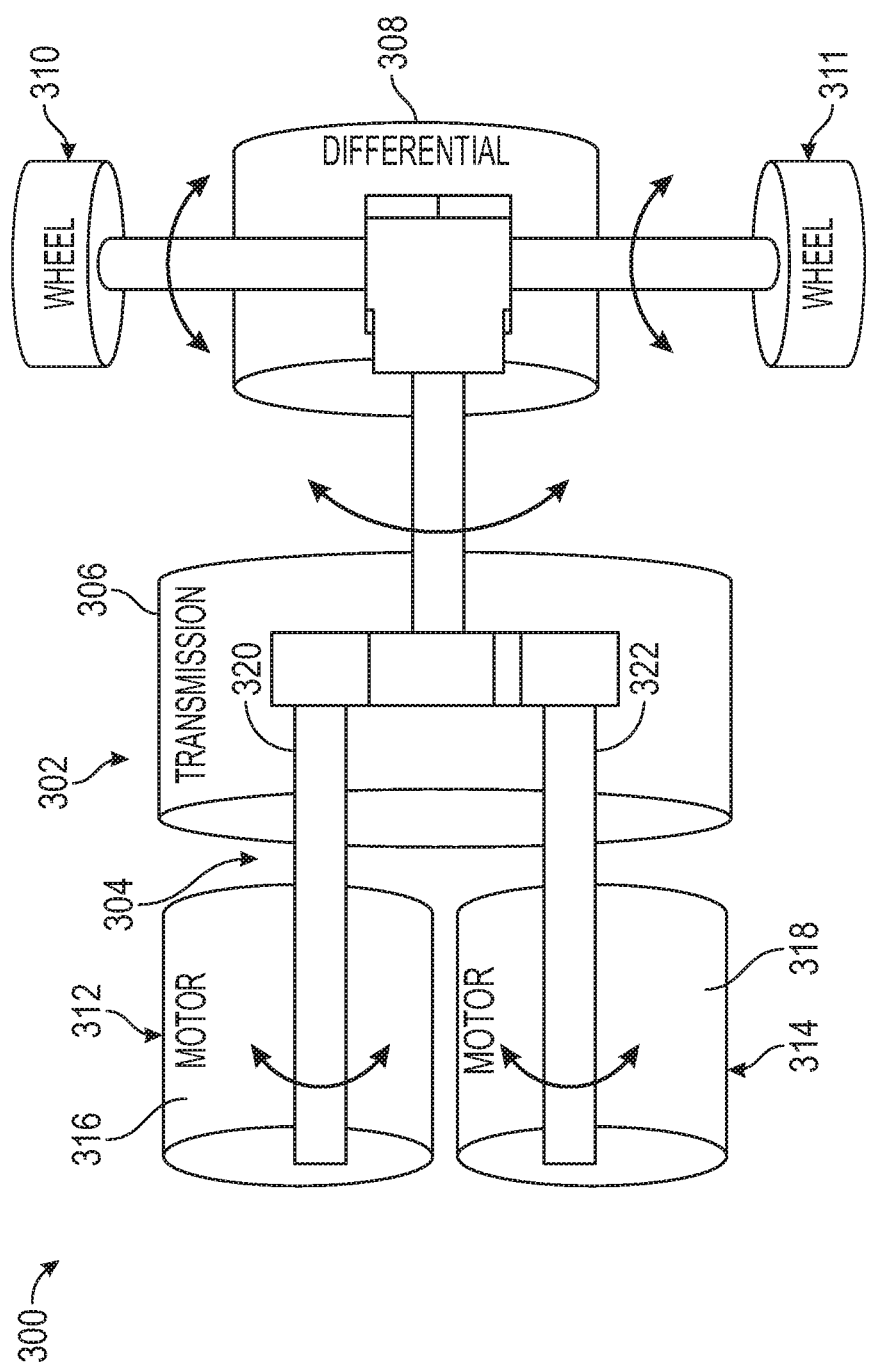
FIG. 3 is a schematic diagram of a portion of another configuration for a powertrain in accordance with one or more embodiments.

FIG. 3 is a schematic diagram of a portion of another configuration for a powertrain in accordance with one or more embodiments. Powertrain 300 includes propulsion system 302, shaft system 304, transmission 306, differential 308, wheel system 310, and wheel system 311. Propulsion system 302 is an example of one implementation for propulsion system 102 in FIG. 1.

Propulsion system 302 includes first motor system 312 and second motor system 314 which are examples of implementations for first motor system 106 and second motor system 108, respectively, from FIG. 1. First motor system 312 includes first motor 316, while second motor system 314 includes second motor 318. First motor system 312 and second motor system 314 may each also include an inverter. Shaft system 304 includes one or more shaft members that are coupled together and/or to the various components of powertrain 300. For example, shaft system 304 includes shaft member 320 connecting first motor 316 to transmission 306 and shaft member 322 connecting second motor 318 to transmission 306.

Transmission 306 adapts the torque produced by first motor 316 and second motor 318 to be transferred to wheel system 310 and wheel system 311. Differential 308 channels that torque to wheel system 310 and wheel system 311. Each of wheel system 310 and wheel system 311 may include one or more wheels, hubs, spokes, rims, tires, other components, or a combination thereof.

In one or more embodiments, a torque control system, such as torque control system 110 in FIG. 1, may be used to alternate between first motor system 312 and second motor system 314 during a stall condition. This alternating between first motor system 312 and second motor system 314 may be performed in any of the various ways described herein. As one example, while both first motor 316 and second motor 318 are stopped (e.g., have a speed of substantially zero), torque may be produced by a selected motor system of first motor system 312 and second motor system 314 to meet the requested torque needed to maintain the stall condition. When a thermal condition of that selected motor system meets a selected set of criteria, the torque control system switches torque production from the selected motor system to the other of first motor system 312 and second motor system 314.

Figure 4:
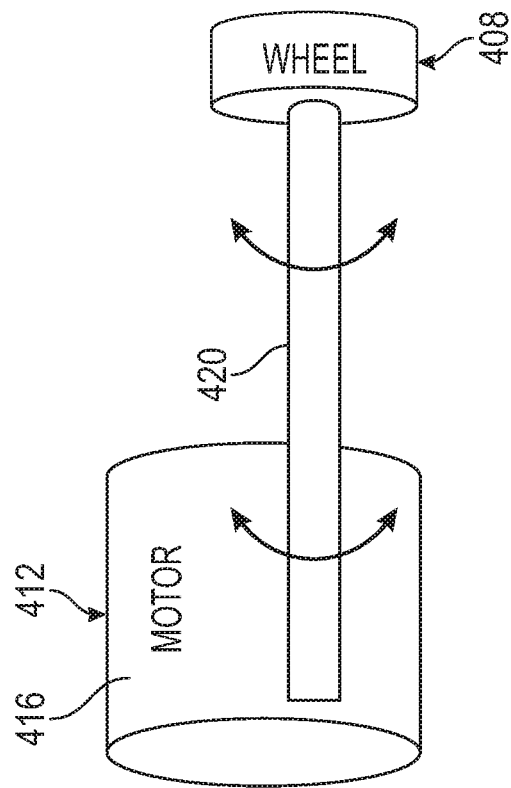
FIG. 4 is a schematic diagram of a portion of yet another configuration for a powertrain in accordance with one or more embodiments.
Figure 4:
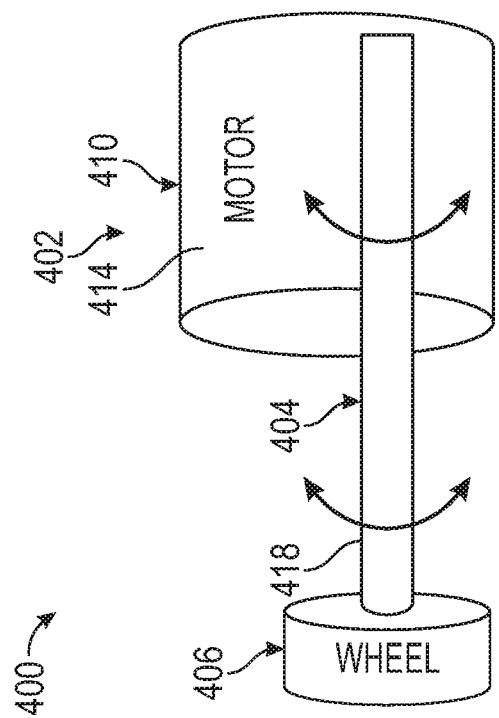

FIG. 4 is a schematic diagram of a portion of yet another configuration for a powertrain in accordance with one or more embodiments. Powertrain 400 includes propulsion system 402, shaft system 404, wheel system 406, and wheel system 408. Propulsion system 402 is an example of one implementation for propulsion system 102 in FIG. 1.

Propulsion system 402 includes first motor system 410 and second motor system 412 which are examples of implementations for first motor system 106 and second motor system 108, respectively, from FIG. 1. First motor system 410 includes first motor 414, while second motor system 412 includes second motor 416. First motor system 410 and second motor system 412 may each also include an inverter.

Shaft system 404 includes one or more shaft members that are coupled together and/or to the various components of powertrain 400. For example, shaft system 404 includes shaft member 418 coupled to first motor 414 and shaft member 420 coupled to second motor 416. As first motor 414 and second motor 416 are directly coupled to wheel system 406 and wheel system 408, respectively, these motors may be referred to as hub motors.

In one or more embodiments, a torque control system, such as torque control system 110 in FIG. 1, may be used to alternate between first motor system 410 and second motor system 412 during a stall condition. This alternating between first motor system 410 and second motor system 412 may be performed in any of the various ways described herein. As one example, while both first motor 414 and second motor 416 are stopped (e.g., have a speed of substantially zero), torque may be produced by a selected motor system of first motor system 410 and second motor system 412 to meet the requested torque needed to maintain the stall condition. When a thermal condition of that selected motor system meets a selected set of criteria, the torque control system switches torque production from the selected motor system to the other of first motor system 410 and second motor system 412.

Figure 5:
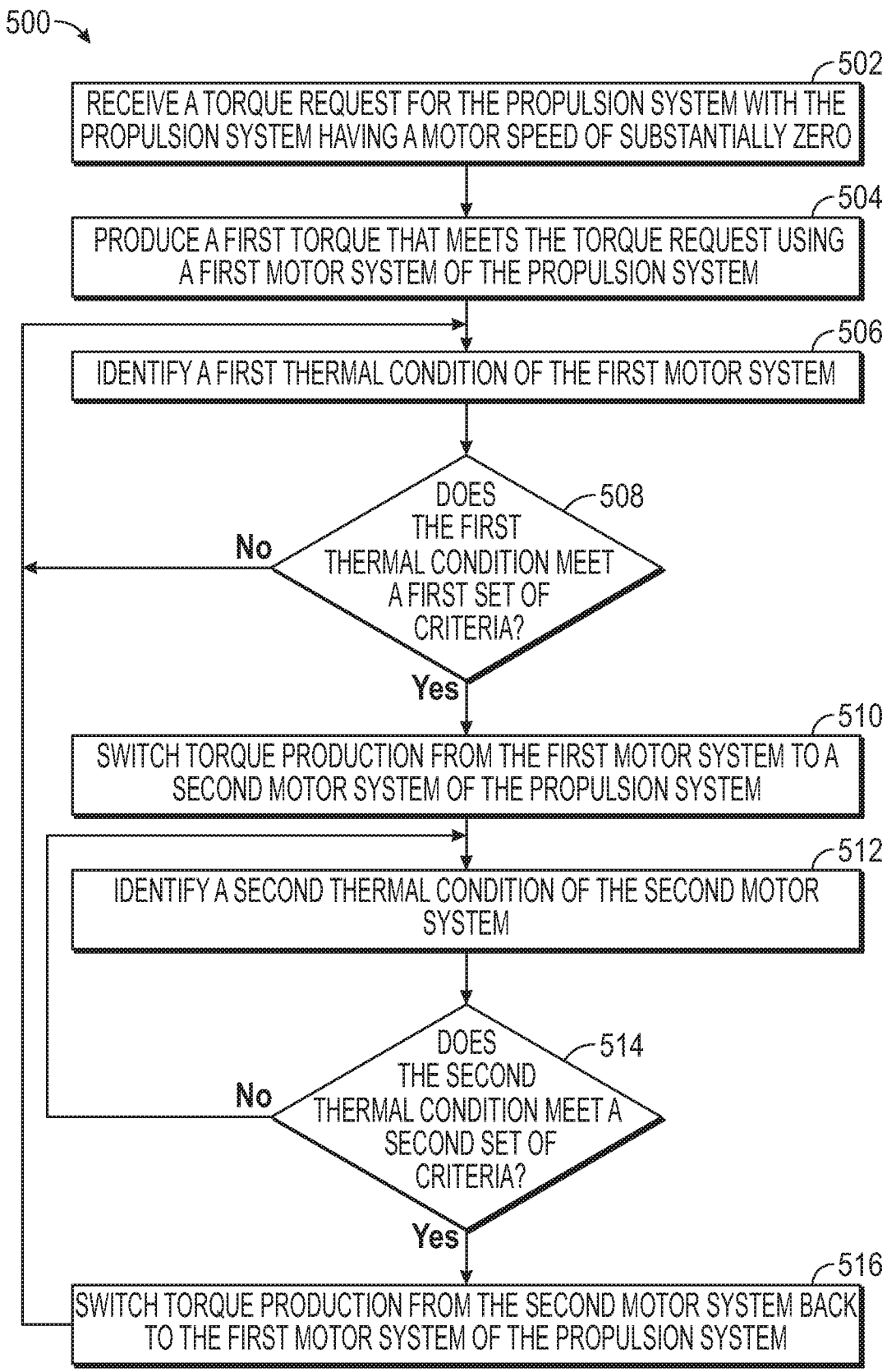
FIG. 5 is a flowchart of a method for controlling torque production by a propulsion system in accordance with one or more embodiments.

FIG. 5 is a flowchart of a method 500 for controlling torque produced by a propulsion system in accordance with one or more embodiments. Method 500 is illustrated as a set of operations or steps and is described with continuing reference to FIG. 1. One or more operations or steps that are not expressly illustrated in FIG. 5 may be included before, after, in between, or as part of the operations or steps of method 500. In some embodiments, one or more of the operations or steps may be implemented, at least in part, in the form of executable code stored on non-transitory, tangible, machine-readable media that when run by one or more processors may cause the one or more processors to perform one or more of the processes. Method 500 may be implemented using torque control system 110 and propulsion system 102 described in FIG. 1.

Method 500 may begin by receiving a torque request for the propulsion system with the propulsion system having a motor speed of substantially zero (step 502). The propulsion system may be, for example, propulsion system 102 of vehicle 100 in FIG. 1. The torque request may be, for example, torque request 116 in FIG. 1.

The torque request may be a request for a nonzero torque. In other words, the request for torque may be for torque that is not zero or torque that is outside of a selected range from zero. The selected range may depend on the type of vehicle in which the propulsion system is being used, as well as other factors. The selected range may be, for example, but is not limited to, 0.25 Newton-meter (Nm), 0.5 Nm, 1 Nm, 2 Nm, 3 Nm, 5 Nm, 7 Nm, 10 Nm, 12 Nm, 20 Nm, or some other specified torque value. For example, when the selected range is 5 Nm, the torque request may be any request for torque beyond 5 Nm from zero (e.g., >5 Nm or <−5 Nm).

The motor speed of the propulsion system may include the speed of a first motor in a first motor system of the propulsion system and the speed of a second motor in a second motor system of the propulsion system. Thus, the motor speed of the propulsion system may be considered substantially zero when the speed of the first motor and the speed of the second motor are both substantially zero. Substantially zero includes zero and may include other values within a selected range of zero. With respect to motor speed, this selected range may be, for example, but is not limited to, 10 revolutions per minute (rpm), 20 rpm, 50 rpm, 75 rpm, 100 rpm, 125 rpm, or some other value for speed. For example, when the selected range is 100 rpm, a speed between and including 0 to 99.99 rpm (or 0 to 100 rpm) may be considered substantially zero.

A first torque that meets the torque request is produced using the first motor system of the propulsion system (step 504). In these embodiments, only the first motor system is used at first to meet the torque request. Step 504 may be performed by ramping up the first torque produced by first motor system to fulfill the torque request.

A first thermal condition of the first motor system is identified (step 506). This first thermal condition may be, for example, first thermal condition 124 in FIG. 1. In one or more embodiments, the first thermal condition may be, but is not limited to, a temperature for the first motor system. This temperature may be, for example, a measured temperature or a temperature extrapolated using information from a sensor system.

A determination is made as to whether the first thermal condition meets a first set of criteria (step 508). In one or more embodiments, the first set of criteria may be first set of criteria 125 described with respect to FIG. 1. If the first thermal condition meets the first set of criteria, torque production is switched from the first motor system to a second motor system of the propulsion system (step 510). This switching may include ramping down the torque produced by the first motor system to zero and ramping up the torque produced by the second motor system to meet the torque request.

A second thermal condition of the second motor system is identified (step 512). This second thermal condition may be, for example, second thermal condition 128 in FIG. 1. A determination is made as to whether the second thermal condition meets a second set of criteria (step 514). In one or more embodiments, the second set of criteria may be second set of criteria 130 described with respect to FIG. 1.

If the second thermal condition meets the second set of criteria, torque production is switched from the second motor system back to the first motor system of the propulsion system (step 516), with the process then returning to step 506. In step 512, the switching may include ramping down the torque produced by the second motor system to zero and ramping up the torque produced by the first motor system to meet the torque request.

Thus, the handing off of torque production between the two motor systems extends the allowable stall time. In some embodiments, this "handing off" may be performed as long as the stall condition is needed. In one or more embodiments, various steps (e.g., steps 506-516) of method 500 may be repeated until at least one of a request for zero torque (or a request for substantially zero torque) is received or the motor speed of the propulsion system becomes nonzero (e.g., not zero or outside of a selected range of zero).

Figure 6:
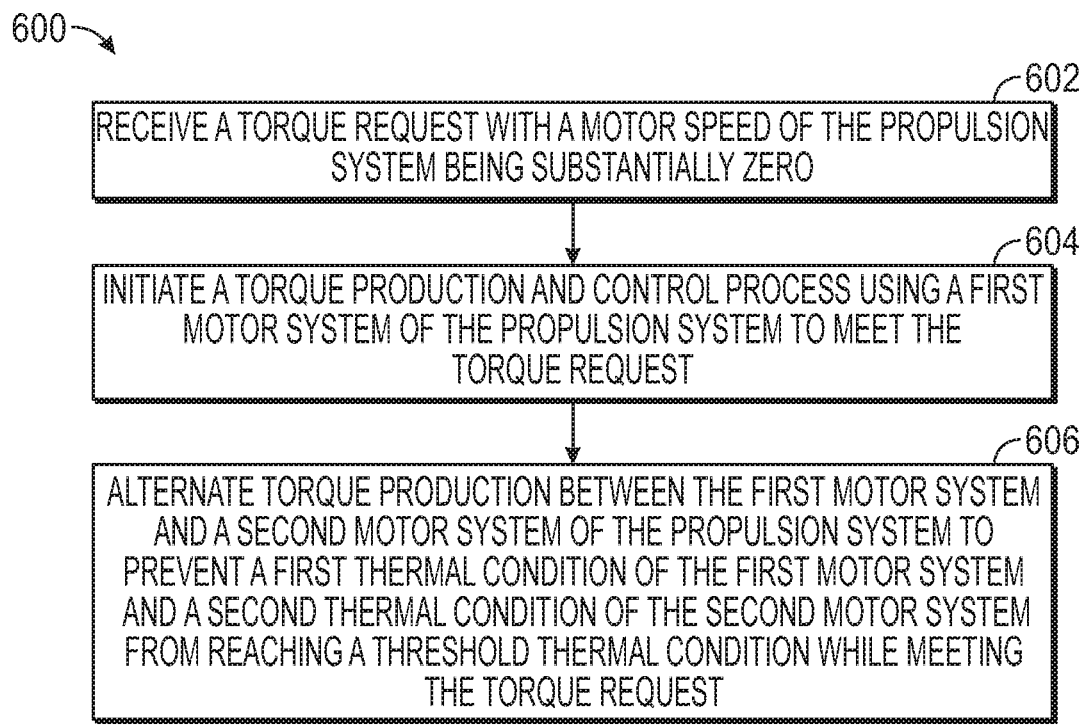
FIG. 6 is a flowchart of a method for controlling torque production by a propulsion system in accordance with one or more embodiments.

FIG. 6 is a flowchart of a different method 600 for controlling torque production by a propulsion system in a vehicle in accordance with one or more embodiments. Method 600 is illustrated as a set of operations or steps and is described with continuing reference to FIGS. 1 and 2. One or more operations or steps that are not expressly illustrated in FIG. 6 may be included before, after, in between, or as part of the operations or steps of method 600. In some embodiments, one or more of the operations or steps may be implemented, at least in part, in the form of executable code stored on non-transitory, tangible, machine-readable media that when run by one or more processors may cause the one or more processors to perform one or more of the processes. Method 600 may be implemented using torque control system 110 and propulsion system 102 described in FIG. 1.

Method 600 may begin by receiving a torque request with a motor speed of the propulsion system being substantially zero (step 602). A torque production and control process is initiated using a first motor system of the propulsion system to meet the torque request (step 604). The torque production and control process includes producing torque and controlling which motor system(s) of a plurality of motor systems (e.g., a first motor system and a second motor system) is producing the torque at any given point in time.

Torque production is alternated between the first motor system and a second motor system of the propulsion system to prevent a first thermal condition of the first motor system and a second thermal condition of the second motor system from reaching a threshold thermal condition while meeting the torque request (step 606). In one or more embodiments, step 606 includes determining whether a first thermal condition of the first motor system meets a first set of criteria selected for the first motor system and determining whether a second thermal condition of the second motor system meets a second set of criteria selected for the second motor system. The first set of criteria for the first motor system may include one or more of the same or one or more different criteria from the second set of criteria for the second motor system.

In other embodiments, step 606 includes switching from the first motor system to the second motor system when a first thermal condition of the first motor system reaches a high threshold temperature. In these embodiments, step 606 may further include switching from the second motor system back to the first motor system when the first thermal condition of the first motor system reaches a low threshold temperature or when the second thermal condition of the second motor system reaches a high threshold temperature. In this manner, the first motor system and the second motor system are prevented from reaching the threshold thermal condition, which may be, for example, an unsafe thermal condition or a thermal condition that could result in undesired effects (e.g., damage).

In one or more embodiments, the alternating between motor systems in step 606 may be performed until at least one of a request for zero torque (or a request for substantially zero torque) is received or the motor speed of the propulsion system becomes nonzero (e.g., not zero or outside of a selected range of zero). For example, when a vehicle no longer needs to maintain a stall condition (e.g., maintain an accelerator hold condition), the control of torque production described in method 600 may no longer be needed.

Figure 7:
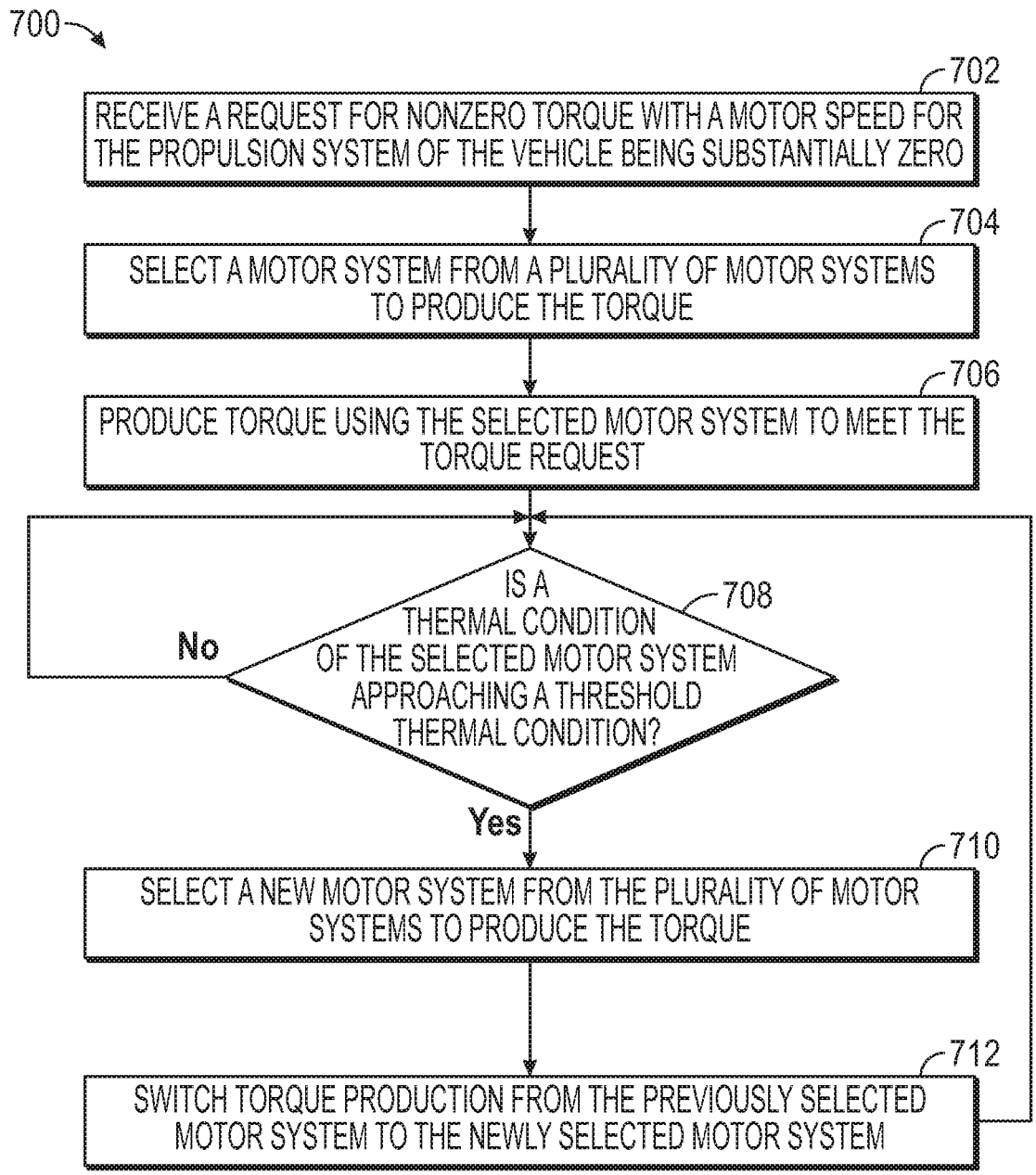
FIG. 7 is a flowchart of a method for controlling torque production by a propulsion system in accordance with one or more embodiments.

FIG. 7 is a flowchart of a method 700 for controlling torque production by a propulsion system in accordance with one or more embodiments. Method 700 is illustrated as a set of operations or steps and is described with continuing reference to FIGS. 1 and 2. One or more operations or steps that are not expressly illustrated in FIG. 7 may be included before, after, in between, or as part of the operations or steps of method 700. In some embodiments, one or more of the operations or steps may be implemented, at least in part, in the form of executable code stored on non-transitory, tangible, machine-readable media that when run by one or more processors may cause the one or more processors to perform one or more of the processes. Method 700 may be implemented using torque control system 110 and propulsion system 102 described in FIG. 1.

Method 700 may begin by receiving a request for torque with a motor speed for the propulsion system of the vehicle being substantially zero (step 702). In step 702, the request is for nonzero torque. The motor speed may be substantially zero by being zero or within a selected range of zero. A motor system is selected from a plurality of motor systems to produce the torque (step 704). The plurality of motor systems may be, for example, plurality of motor systems 104 in FIG. 1. Torque is produced using the selected motor system to meet the torque request (step 706).

A determination is made as to whether a thermal condition of the selected motor system is approaching a threshold thermal condition (step 708). The threshold thermal condition may be, for example, but is not limited to, a temperature that has been previously determined to be unsafe or a temperature at which one or more undesired effects may occur. In some embodiments, the threshold thermal condition is specific to the selected motor system being used to the produce torque. In step 708, a thermal condition may be determined to be "approaching" the threshold thermal condition if the thermal condition is within a selected range of the threshold thermal condition.

The threshold thermal condition is dependent on the type of motor system. In one or more embodiments, the threshold thermal condition is a critical temperature for the motor system similar to the critical temperatures described above for first motor system 106 and second motor system 108 in FIG. 1. In some embodiments, the critical temperature is selected from between about 130 degrees Celsius and about 155 degrees Celsius. In these cases, any temperature above a high threshold temperature set at an interval below the critical temperature would be considered as "approaching" the threshold thermal condition. In some embodiments, the high threshold temperature may be set to a temperature selected from 80 degrees Celsius and above. For example, the high threshold temperature may be, but is not limited to, about 105 degrees Celsius, about 110 degrees Celsius, about 115 degrees Celsius, about 120 degrees Celsius, or some other temperature at or above 80 degrees Celsius.

If the thermal condition of the selected motor system is approaching the threshold thermal condition, the method 700 returns to step 706 described above. Otherwise, a new motor system is selected from the plurality of motor systems to produce the torque (step 710). In step 710, the new motor system may be any motor system that has a thermal condition that meets a set of restart criteria. As one example, the new motor system selected may be a motor system that has a temperature below a low threshold temperature (e.g., below about 80 degrees Celsius, below about 10 degrees Celsius, etc.). The low threshold temperature may be, for example, but is not limited to, about 65 degrees Celsius, about 70 degrees Celsius, about 75 degrees Celsius, or some other temperature.

Thereafter, torque production is switched from the previously selected motor system to the newly selected motor system (step 712), with the process returning to step 704 described above. In step 712, switching from the previously selected motor system to a newly selected motor system may include ramping down the torque produced by the selected motor system to zero to allow the selected motor system to cool off, and ramping up the torque produced by the newly selected motor system to meet the torque request.

In one or more embodiments, the switching of motor systems described in method 700 may be performed until at least one of a request for zero torque (or a request for substantially zero torque) is received or the motor speed of the propulsion system becomes nonzero (e.g., not zero or outside of a selected range of zero). For example, steps 708-712 may be repeated until a vehicle no longer needs to maintain a stall condition (e.g., maintain an accelerator hold condition).

The flowcharts and block diagrams in the different depicted embodiments illustrate the architecture, functionality, and operation of some possible implementations of apparatuses and methods in an embodiment. In this regard, each block in the flowcharts or block diagrams may represent a module, a segment, a function, and/or a portion of an operation or step. In some alternative implementations of an embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 8:
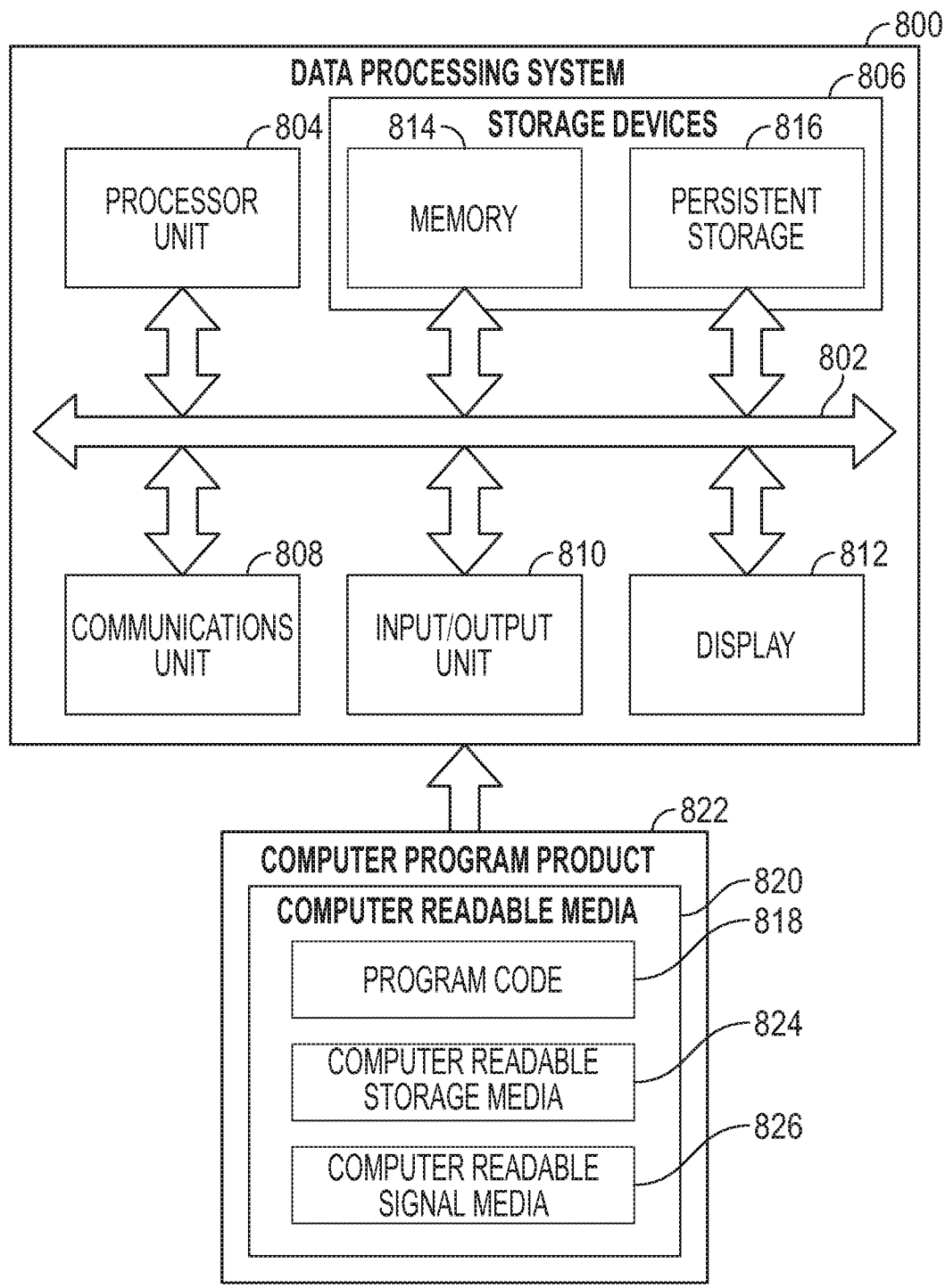
FIG. 8 is a block diagram of a data processing system in accordance with one or more embodiments.

FIG. 8 is a block diagram of a data processing system in accordance with one or more embodiments. Data processing system 800 is an example one manner in which computer system 112 in FIG. 1 may be implemented. As depicted, data processing system 800 includes communications framework 802, which provides communications between processor unit 804, storage devices 806, communications unit 808, input/output unit 810, and display 812. In some cases, communications framework 802 may be implemented as a bus system.

Processor unit 804 is configured to execute instructions for software to perform a number of operations. Processor unit 804 may comprise a number of processors, a multi-processor core, and/or some other type of processor, depending on the implementation. In some cases, processor unit 804 may take the form of a hardware unit, such as a circuit system, an application specific integrated circuit (ASIC), a programmable logic device, or some other suitable type of hardware unit.

Instructions for the operating system, applications, and/or programs run by processor unit 804 may be located in storage devices 806. Storage devices 806 may be in communication with processor unit 804 through communications framework 802. As used herein, a storage device, also referred to as a computer readable storage device, is any piece of hardware capable of storing information on a temporary and/or permanent basis. This information may include, but is not limited to, data, program code, and/or other information.

Memory 814 and persistent storage 816 are examples of storage devices 806. Memory 814 may take the form of, for example, a random-access memory or some type of volatile or non-volatile storage device. Persistent storage 816 may comprise any number of components or devices. For example, persistent storage 816 may comprise a hard drive, a solid-state drive, a flash memory, a rewritable optical disk, a rewritable magnetic tape, or some combination of the above. The media used by persistent storage 816 may or may not be removable.

Communications unit 808 allows data processing system 800 to communicate with other data processing systems and/or devices. Communications unit 808 may provide communications using physical and/or wireless communications links.

Input/output unit 810 allows input to be received from and output to be sent to other devices connected to data processing system 800. For example, input/output unit 810 may allow user input to be received through a keyboard, a mouse, and/or some other type of input device. As another example, input/output unit 810 may allow output to be sent to a printer connected to data processing system 800.

Display 812 is configured to display information to a user. Display 812 may comprise, for example, without limitation, a monitor, a touch screen, a laser display, a holographic display, a virtual display device, and/or some other type of display device.

In this illustrative example, the processes of the different illustrative embodiments may be performed by processor unit 804 using computer-implemented instructions. These instructions may be referred to as program code, computer usable program code, or computer readable program code and may be read and executed by one or more processors in processor unit 804.

In these examples, program code 818 is located in a functional form on computer readable media 820, which is selectively removable, and may be loaded onto or transferred to data processing system 800 for execution by processor unit 804. Program code 818 and computer readable media 820 together form computer program product 822. In this illustrative example, computer readable media 820 may be non-transitory (e.g., computer readable storage media 824) or transitory (e.g., computer readable signal media 826).

Computer readable storage media 824 is a physical or tangible storage device used to store program code 818 rather than a medium that propagates or transmits program code 818. Computer readable storage media 824 may be, for example, without limitation, an optical or magnetic disk or a persistent storage device that is connected to data processing system 800.

Alternatively, program code 818 may be transferred to data processing system 800 using computer readable signal media 826. Computer readable signal media 826 may be, for example, a propagated data signal containing program code 818. This data signal may be an electromagnetic signal, an optical signal, and/or some other type of signal that can be transmitted over physical and/or wireless communications links.

The illustration of data processing system 800 in FIG. 8 is not meant to provide architectural limitations to the manner in which the illustrative embodiments may be implemented. The different illustrative embodiments may be implemented in a data processing system that includes components in addition to or in place of those illustrated for data processing system 800. Further, components shown in FIG. 8 may be varied from the illustrative examples shown.

The present embodiments can take the form of an entirely hardware embodiment, an entirely software embodiment, or an embodiment containing both hardware and software elements. Accordingly, it is understood that any operation of the computing systems may be implemented by a computing system using corresponding instructions stored on or in a non-transitory computer readable medium accessible by a processing system. For the purposes of this description, a tangible computer-usable or computer readable medium can be any apparatus that can store the program for use by or in connection with the instruction execution system, apparatus, or device. The medium may include non-volatile memory including magnetic storage, solid-state storage, optical storage, cache memory, and RAM.

As used herein, the phrase "at least one of" when used with a list of items, means different combinations of one or more of the listed items may be used and only one of the items in the list may be needed. The item may be a particular object, thing, step, operation, process, or category. In other words, "at least one of" means any combination of items or number of items may be used from the list, but not all of the items in the list may be required. For example, without limitation, "at least one of item A, item B, or item C" or "at least one of item A, item B, and item C" may mean item A; item A and item B; item B; item A, item B, and item C; item B and item C; or item A and C. In some cases, "at least one of item A, item B, or item C" or "at least one of item A, item B, and item C" may mean, but is not limited to, two of item A, one of item B, and ten of item C; four of item B and seven of item C; or some other suitable combination.

While certain exemplary embodiments of the invention have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art. The intention is to cover all modifications, equivalents and alternatives falling within the spirit and scope of the disclosure as defined by the claims.

What is claimed is:

1. A method for controlling a propulsion system in a vehicle, the method comprising:
   receiving a torque request for the propulsion system with the propulsion system having a motor speed of substantially zero;
   producing a first torque that meets the torque request using a first motor system of the propulsion system;
   identifying a first thermal condition of the first motor system; and
   switching torque production from the first motor system to a second motor system of the propulsion system in response to a determination that the first thermal condition meets a first set of criteria.

2. The method of claim 1, wherein switching the torque production comprises:
   ramping down the first torque produced by the first motor system to zero; and
   ramping up a second torque produced by the second motor system to meet the torque request.

3. The method of claim 2, further comprising:
   identifying a second thermal condition of the second motor system; and
   switching the torque production from the second motor system back to the first motor system in response to a determination that the second thermal condition meets a second set of criteria.

4. The method of claim 3, further comprising:
   repeating switching the torque production from the first motor system to the second motor system in response to the determination that the first thermal condition meets the first set of criteria; and switching the torque production from the second motor system back to the first motor system in response to a determination that the second thermal condition meets the second set of criteria until at least one of a request for substantially zero torque is received or the motor speed of the propulsion system is nonzero.

5. The method of claim 3, wherein switching the torque production from the second motor system back to the first motor system comprises:
   ramping down a second torque produced by the second motor system to zero; and
   ramping up the first torque produced by the first motor system to meet the torque request.

6. The method of claim 1, wherein identifying the first thermal condition comprises:

identifying a temperature for the first motor system using information generated by a sensor system monitoring the first motor system.

7. The method of claim 1, further comprising:
switching the torque production from the second motor system back to the first motor system in response to a determination that the first thermal condition of the first motor system meets a set of restart criteria.

8. The method of claim 7, further comprising:
repeating switching the torque production from the first motor system to the second motor system in response to the determination that the first thermal condition meets the first set of criteria; and switching the torque production from the second motor system back to the first motor system in response to the determination that the first thermal condition of the first motor system meets the set of restart criteria until at least one of a request for substantially zero torque is received or the motor speed of the propulsion system is nonzero.

9. A method for controlling a propulsion system in a vehicle, the method comprising:
receiving a torque request with a motor speed of the propulsion system being substantially zero; and
alternating torque production between a first motor system of the propulsion system and a second motor system of the propulsion system to prevent a first thermal condition of the first motor system and a second thermal condition of the second motor system from reaching a threshold thermal condition while meeting the torque request.

10. The method of claim 9, wherein alternating the torque production between the first motor system and the second motor system comprises:
monitoring a first thermal condition of the first motor system; and
switching the torque production from the first motor system to the second motor system in response to a determination that the first thermal condition is within a selected range of the threshold thermal condition.

11. The method of claim 10, wherein switching the torque production comprises:
ramping down a first torque produced via the first motor system to zero; and
ramping up a second torque produced via the second motor system to meet the torque request.

12. A system comprising:
a propulsion system comprising a first motor system and a second motor system; and
a torque control system configured to receive a torque request with a motor speed of the propulsion system being substantially zero and to alternate torque production between the first motor system and the second motor system to prevent a first thermal condition of the first motor system and a second thermal condition of the second motor system from reaching a threshold thermal condition while meeting the torque request.

13. The system of claim 12, wherein the torque control system is further configured to monitor the first thermal condition of the first motor system and switch torque production from the first motor system to the second motor system in response to a determination that the first thermal condition meets a first set of criteria.

14. The system of claim 13, wherein the torque control system is further configured to switch the torque production from the first motor system to the second motor system by ramping down a first torque produced by the first motor system to zero and ramping up a second torque produced by the second motor system to meet the torque request.

15. The system of claim 13, wherein the torque control system is further configured to switch the torque production from the second motor system back to the first motor system in response to either the second thermal condition meeting a second set of criteria or the first thermal condition meeting a set of restart criteria.

16. The system of claim 15, wherein the torque control system is further configured to switch the torque production from the second motor system back to the first motor system by ramping down a second torque produced by the second motor system to zero and ramping up a first torque produced by the first motor system to meet the torque request.

17. The system of claim 12, further comprising:
a sensor system configured to monitor the first motor system and the second motor system and generate information, wherein the torque control system is configured to identify the first thermal condition and the second thermal using the information.

18. The system of claim 12, wherein the first motor system and the second motor system are electric motor systems coupled to a same shaft.

19. The system of claim 12, wherein the first motor system is coupled to a first shaft, the second motor system is coupled to a second shaft and further comprising:
a transmission, wherein the first shaft and the second shaft are coupled to the transmission.

20. The system of claim 12, wherein the first motor system is coupled to a first wheel system and the second motor system is coupled to a second wheel system.

\* \* \* \* \*